March 3, 1959 R. R. WOODCOCK 2,875,908
PALLET LOADING APPARATUS
Filed Oct. 20, 1955 4 Sheets-Sheet 1

INVENTOR.
Robert R. Woodcock
BY Rowland V. Patrick
Atty.

March 3, 1959 R. R. WOODCOCK 2,875,908
PALLET LOADING APPARATUS
Filed Oct. 20, 1955 4 Sheets-Sheet 2

INVENTOR.
Robert R. Woodcock
BY Rowland & Patrick
Atty.

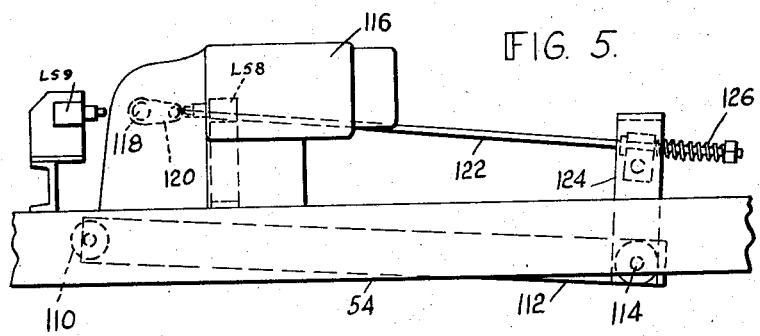
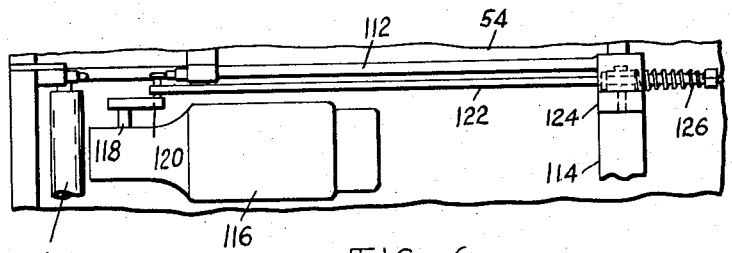
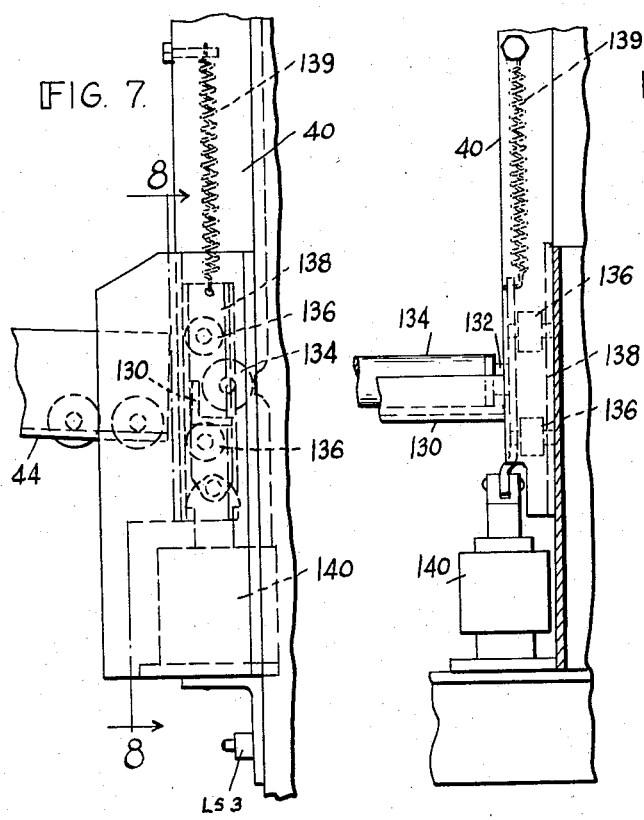

United States Patent Office 2,875,908
Patented Mar. 3, 1959

2,875,908

PALLET LOADING APPARATUS

Robert R. Woodcock, Marblehead, Mass., assignor to J. W. Greer Company, Wilmington, Mass., a corporation of Massachusetts Application October 20, 1955, Serial No. 541,643

9 Claims. (Cl. 214—6)

The present invention relates to material handling apparatus and more particularly to pallet loading apparatus.

The invention is herein disclosed as embodied in a material handling apparatus of the general type which includes a conveyor on which packages or boxes are moved successively to a loading station and are then stacked in tiers on a pallet or other support provided for this purpose.

It is a principal object of the present invention to provide in an apparatus of this general description an improved pallet loading apparatus which is adapted for handling the packages or boxes rapidly and efficiently with a maximum economy of motion and a minimum expenditure of power to stack the packages in tiers on the pallet.

It is another object of the invention to provide a power loading mechanism of this general type which, as an individual unit of a material handling apparatus, will occupy a minimum of floor area coinciding with and not substantially greater than the space required for the pallet and the stacked packages thereon.

It is another object of the invention to provide an improved stripper mechanism including a stripper bar which is actuated with greater certainty and efficiency to engage and position the package layer to be dropped onto the pallet when the roller platform is withdrawn and which is thereafter returned to its normally inoperative position.

In carrying out the present invention a pallet loading apparatus is provided which takes the form generally of a vertically disposed rectangular frame having mounted therein an elevator and adapted to receive beneath the elevator at a low level a package supporting pallet. Packages are supplied to the apparatus on a package loading conveyor at a level substantially above the level of the fully stacked pallet load. In the elevator packages are loaded onto an elevator platform supported for movement with the elevator and shiftable from a package supporting position to discharge packages therefrom. A package stripper is mounted on the elevator for movement between package stripping and inoperative positions for stripping packages from the laterally displaced platform.

In the preferred form of the invention shown the elevator platform takes the form of a series of supporting rollers mounted between two flexible carriers which are in turn mounted on the elevator at each side thereof and which at the edge of the elevator are turned upwardly at right angles so that the elevator platform may be readily withdrawn and returned to its operative position without the necessity of projecting the withdrawn portions of the elevator platform outwardly from the rectangular frame housing the pallet loading apparatus.

An important feature of the illustrated construction consists in the simplified and more compact construction and arrangement of the package loading apparatus in which the elevator is located directly above and covers an area only slightly in excess of that required for the pallet, and in which the roller platform is supported and operated directly from the elevator, thus eliminating the costly and cumbersome laterally shiftable carriage provided in most prior art constructions.

A further feature of the invention consists in the improved construction and arrangement of the stripper mechanism which comprises a separate stripper motor carried on the elevator, and a stripper bar actuated thereby to yieldably engage with and support the package layer on the lower platform in position to be dropped onto the pallet when the roller platform is withdrawn.

Other features of the invention consist in the preferred construction and arrangement of the several cooperating elements of the pallet loading apparatus hereinafter specifically set forth.

With the above noted and other objects in view as may hereinafter appear, the invention consists also in the devices, combinations and arrangement of parts hereinafter described and claimed, which together with the advantages to be obtained thereby will be readily understood by one skilled in the art from the following description taken in connection with the accompanying drawings, in which Fig. 1 is a view in side elevation of a pallet loading apparatus embodying in the preferred form several features of the invention;

Fig. 5 is an enlarged view in side elevation of the stripper mechanism including the stripper driving motor;

Fig. 6 is a plan view of the stripper mechanism shown in Fig. 5;

Fig. 7 is a detail view in side elevation on an enlarged scale of the gate mechanism indicated in Fig. 1;

Fig. 8 is a view in front elevation, partly in section, taken on line 8—8 of Fig. 7.

The pallet loading apparatus which forms the subject matter of the present invention is an improvement upon pallet loading devices generally in that a simplified, and at the same time, fully automatic mechanism is provided of which the moving supports consist only of an elevator which is loaded always in a high position and is thereafter moved downwardly for unloading, and of a roller platform which is mounted directly upon the elevator and is shifted to alternative positions on the elevator for supporting the unit layer and thereafter for dropping the unit layer onto the pallet. The apparatus for loading units herein disclosed is well adapted for use in any pallet loading machine of the general type having means for automatically positioning pallets successively in loading position, and means for automatically loading individual units such as package goods, in tiered relation on each successively positioned pallet.

Figure 1:
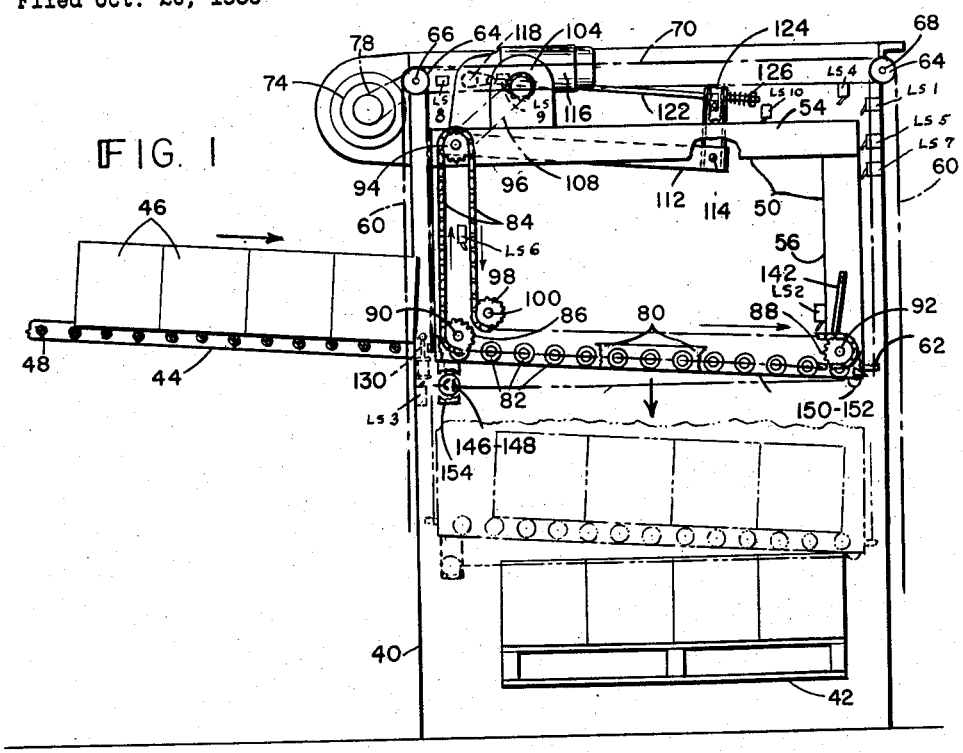
Figure 2:
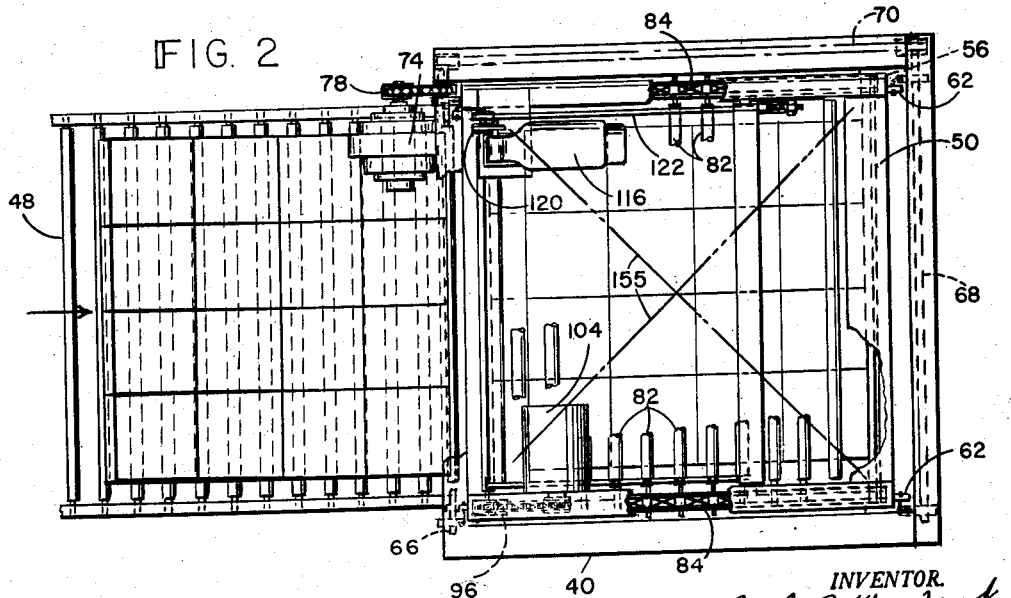
Fig. 2 is a plan view of the apparatus shown in Fig. 1.

Referring specifically to Figs. 1 and 2 of the drawings, the pallet loading apparatus comprises a generally rectangular frame 40 which is adapted to receive in a lower portion thereof the pallet 42 to be loaded. Packages are supplied to the loading apparatus by means of a conveyor system of any ordinary description terminating in a slightly inclined loading conveyor 44 on which packages 46 are supplied to the loading apparatus at a level which is substantially above the fully loaded height of the tiered packages on the pallet 42. The loading conveyor 44 consists specifically of a pair of spaced side rails and a series of idler rollers 48 supported therebetween.

Housed within the frame 40 is a vertically shiftable elevator 50 which takes the form of an open frame including a horizontally disposed rectangular frame 54, downwardly extending frame members 56 at each corner of the elevator, and a second rectangular frame 58 secured to the frame members 56 adjacent their lower ends. The elevator is supported for vertical movement from four chains 60, one being disposed at each corner of the elevator and attached thereto by means of a pin 62 at the lower corner.

Figure 3:
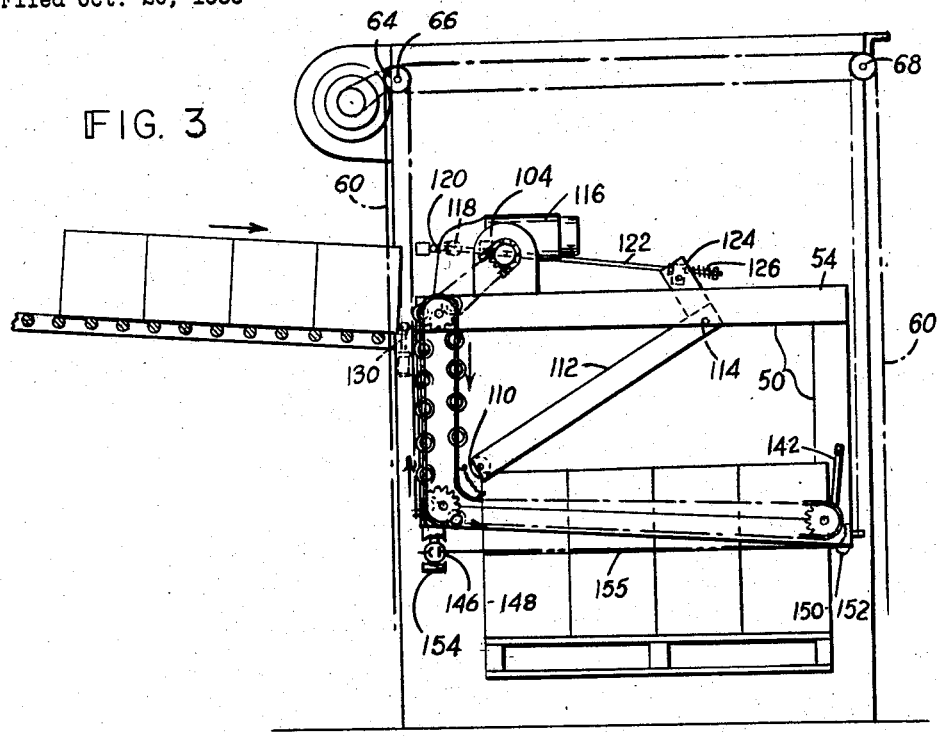
Fig. 3 is a side view of the apparatus shown in Fig. 1, but with the elevator platform in a depressed position, and with the stripper applied and the platform withdrawn by the completion of a tier loading operation.
Figure 4:
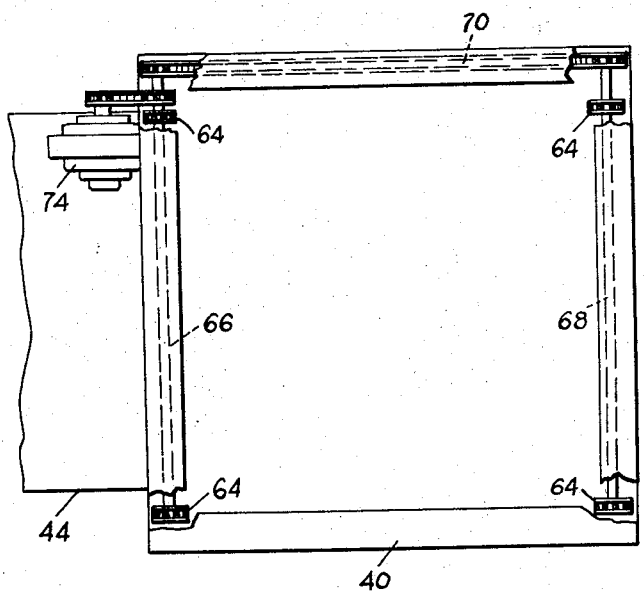
Fig. 4 is a somewhat diagrammatic plan view of the elevator driving mechanism.
Figure 9:
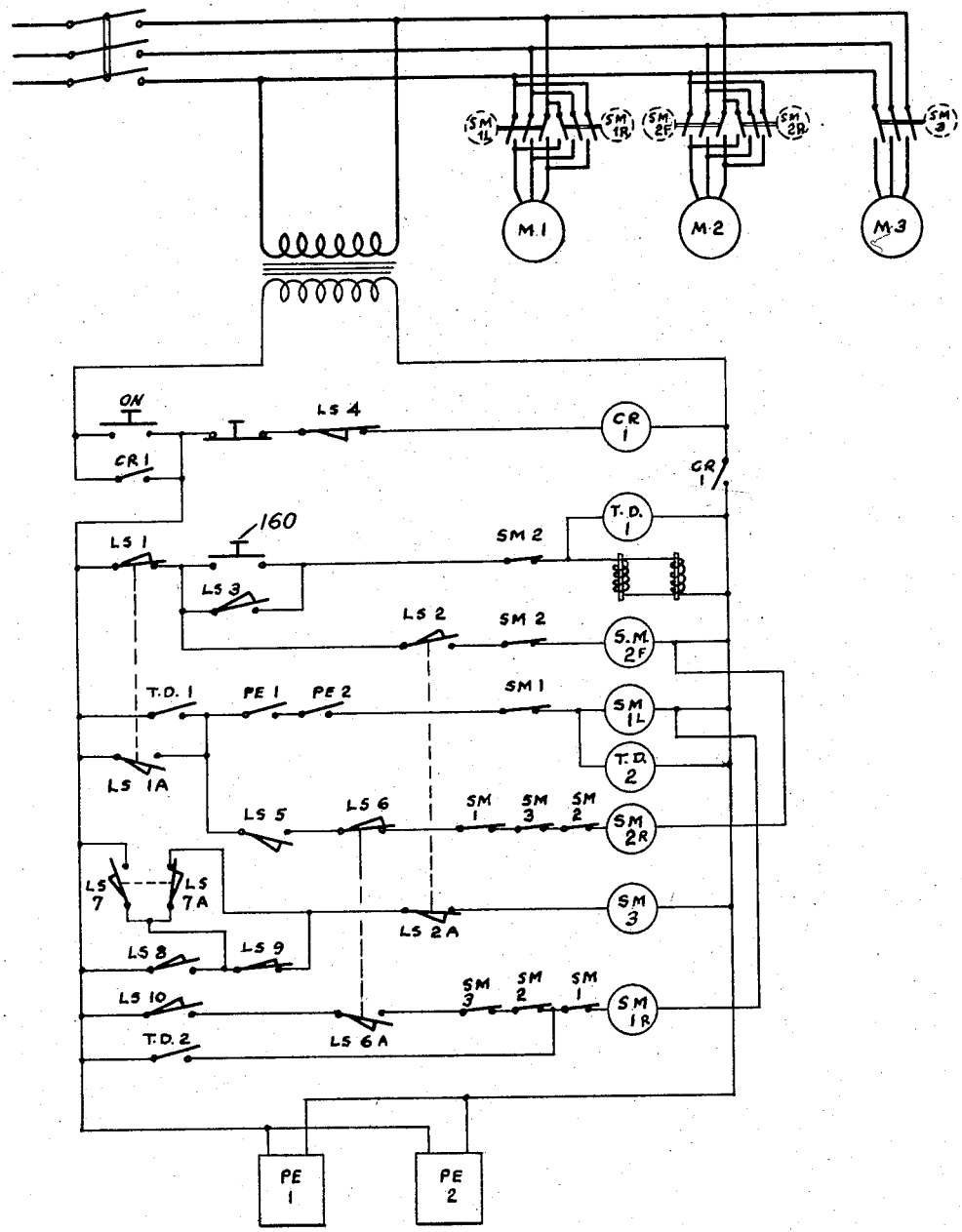
Fig. 9 is a diagrammatic view of the electrical connections for operating the loading mechanism.

Each of the chains 60 passes upwardly over a sprocket 64, two of said sprockets being mounted on a sprocket cross shaft 66 at the left hand side of the frame 40 at the top thereof, as shown in Figs. 1–3, and the other two sprockets being mounted on a cross shaft 68 located at the right hand side of the frame 40. The sprocket shafts 66 and 68 are connected to turn as a unit by means of a sprocket chain 70. The elevator is raised and lowered by means of an electric gear reduction motor 74 which is mounted at the front of the pallet loading frame. The motor 74 is connected to drive the sprocket shaft 66 by means of a sprocket chain 78 which rides over sprockets mounted respectively on the motor output shaft and on the shaft 66.

The elevator is provided with a package supporting platform which is particularly constructed and arranged to receive a row of packages from the high level loading conveyor 44, and thereafter when the elevator has been depressed, to be withdrawn horizontally in order to strip therefrom and to drop the packages in tiered relation onto the pallet located in loading position beneath the elevator. The platform which is generally indicated at 80 consists of a series of idler rollers 82 which are supported between two endless carrier chains 84, one such chain being mounted at the near side of the elevator frame, and the other being mounted at the further side of the elevator frame, as shown in Figs. 1, 2, and 3. Each of the chains 84, referred to, passes around two idler sprockets 86, 88, passes upwardly around a sprocket 94 on a transversely extending shaft 96 at the upper left edge thereof, thence downwardly around an idler sprocket 98 and thence to the right around the sprocket 88, above referred to. As will be noted from Fig. 1, the number of rollers 82 provided is just sufficient to provide a platform entirely across the lower face of the elevator 50 when the platform is in loading position. Movement of the endless chains 84 in a generally clockwise direction as indicated by the arrows of Fig. 1 will cause the platform provided by the rollers 82 to be withdrawn to the left so that the individual packages will be stripped from the platform and dropped in tiered relation onto the pallet 42. Shifting movements are imparted to the endless chains 84 and platform rollers 82 mounted thereon from one to the other position by means of an electric gear reduction motor 104 which is mounted on the upper frame 54 of the elevator. The motor 104 is connected to drive sprocket shaft 96 and chains 84 by means of connections which includes a sprocket chain 108 supported to ride on sprockets carried respectively on the output shaft of motor 104 and on the sprocket shaft 96.

The pallet loading apparatus herein disclosed is further provided with a stripper which takes the form of a roller 110 which extends transversely across the elevator 50 and is supported at its two ends on two parallel arms 112 or levers carried on a rock shaft 114 pivoted on the respective side portion of the top frame 54 of the elevator. The stripper arms 112 and roller 110 are rocked between a raised inoperative and a downward package engaging position by means of an electric gear reduction motor 116. A crank arm 120 secured to the output shaft 118 of the motor 116 is connected by means of a link 122 with an upwardly extending arm 124 secured to turn as a unit with one of the levers 112. The link 122 passes through a pivoted block on the arm 124 and is arranged to be acted upon by a compression spring 126 coiled about the link between the arm 124 and a stop nut threaded to the end of the link. The arrangement is such that when the motor is driven, the stripper roller 110 is moved downwardly against the packages on the elevator. This movement is continued sufficiently to place the spring 126 under some compression, further motion being stopped by switch LS8. The motor when subsequently driven again returns the stripper to its inoperative position, further motion being stopped by switch LS9.

Additional facilities employed for handling the packages 46 includes a gate 130 in the form of a metal bar which extends across the conveyor 44 at the point of separation between the conveyor and the pallet loading apparatus. The metal bar has an L-shaped cross section including a vertical side which is arranged for engagement against the leading packages on the conveyor 44 and a bottom rearwardly extending horizontal side. Each end of the gate 130 is provided with a bracket 132 which provides a bearing support for a roller 134 which is mounted within the L-shaped bar, and the upper surface of which extends substantially above the vertical side of the gate. The brackets 132 are supported between two roller shoes 136 which ride in vertical tracks 138 at each side of the frame of the pallet loading apparatus. The gate 130 is normally held in a raised blocking position in which the vertical side of the gate will engage and arrest the advance of any packages passing down the loading conveyor 44 by means of a pair of tension springs 139 having their ends secured respectively between the brackets 132 and points on the frame 40. The gate is moved downwardly to its inoperative position to permit the movement of the packages 46 onto the platform of the pallet loading apparatus by means of solenoids 140, which are mounted on the frame beneath the gate and the armatures of which are secured the brackets 132. When packages 46 are released and permitted to move onto the elevator or platform they will be arrested in the desired position against a bumper 142 mounted at the rear end of the elevator as best shown in Figs. 1 and 2.

The particular gate mechanism above generally described forms specifically no part of the present invention and is more fully described and claimed as part of a separate invention in an application of Clifford B. Keyes, Serial No. 541,652 filed in the U. S. Patent Office October 20, 1955, for Pallet Loading Apparatus.

Boxes are supplied and are fed in a continuous row to the pallet loading apparatus down the inclined conveyor 44. Assuming the position of the apparatus shown in Fig. 1 in which the elevator has been raised to its topmost position, the solenoids 140 are energized to shift the gate 130 to the open position, thus permitting the boxes 46 shown on conveyor 44 to continue their movement down the incline along rollers 82 into engagement with the bumper 142 whereupon the solenoids 140 are deenergized and the gate 130 rises to its arrest position.

The subsequent downward movement of the elevator and platform is arrested as the platform reaches its pallet loading position by the action of two photoelectric cells 146, 148 which, together with their cooperating light sources 150, 152, are mounted on downwardly extending supports 154 carried by the elevator and form a diagonal light beam 155. The downward movement of the carriage continues until the light beams between the light sources and photoelectric cells are interrupted either by an intervening package or by the pallet.

The operation of the pallet loading apparatus here-in disclosed as embodying in a preferred form the several features of the invention will be briefly described as follows in connection with the somewhat diagrammatic view of switching controls and the electrical diagram illustrating the electrical control circuit for these switching controls.

Referring particularly to Fig. 1, reference may be had to the following switches. Switch LS-1 is located on the top portion of the frame 40 and is arraanged to be operated by the vertical motion of the elevator. This switch is a safety interlock, which prevents the dropping of the gate unless the carriage is at the proper loading level and the rolls are lowered to receive the packages. Switch LS-1-A is shown only in the electrical diagram and is provided for the purpose of transporting power to the elevator down circuit and to the platform reverse circuit when secondary relay TD-1, also found in the electrical diagram, becomes deenergized. Switch LS-2 is mounted to move with the elevator and acts when actuated to stop the downward and rearward movement of the platform in package receiving position. Switch LS-2-A is arranged to prevent the turn of the stripping arm until the platform is in its down rearward loading position. Switch LS-3 is located on the frame 40 below the gate and operates to hold the gate down when the starting switch is released. Switch LS-4 is mounted on the main frame 40 at the top and acts as a safety stop in the event that the elevator should rise beyond the normal stop position. Switch LS-5 is mounted on the main frame one or two inches below the main frame 40 and one or two inches below the fully raised inoperative platform position. This switch is operated by the vertical motion of the elevator and is a fork type limit switch. This switch allows the platform to reverse the moment the elevator reaches unloading position and the stripping arm reaches stripping position. Switch LS-6, mounted to move with the elevator is adapted to arrest the reverse movement of the platform to its inoperative raised position. Switch LS-6-A shown only on the electrical diagram prevents the elevator from rising until the platform rolls are clear of the load. Switch LS-7 is mounted on the main frame 40 one or two inches below the top platform position, and is operated by the vertical motion of the elevator. This is a fork type limit switch which operates to start the stripping arm down when the elevator descends, and causes the arm to start up when the elevator rises. Switch LS-8 is carried on the elevator and is arranged to be operated by the crank arm of the stripper mechanism. Switch LS-8 stops the arm in its up position and a companion switch LS-9 also mounted on the elevator operates to stop the arm in stripping position. Switch LS-10 is mounted on the main frame 40, and is operated by the vertical motion of the elevator 50, and operates to stop the elevator and platform thereon at the proper loading position. The photoelectric controls in contact are designated at PE-1 and PE-2.

In order to start the machine the operator depresses the start button, marked "On" in the electrical diagram. This energizes relay CR-1 closing the control circuit including a holding circuit around the "On" button. The operator now arranges the packages on the required pattern and slides successive rows down toward the gate. When the packages have been arranged to form a complete pattern or tier of units the operator presses the gate button 160 which energizes the gate solenoids, and at the same time energizes a time relay TD-1. The packages released by the downward movement of the gate 130 roll onto the carriage and into engagement with their stop 142. After the relay TD-1 times out, contact TD-1 closes energizing the elevator down switch relay SMIL. The elevator now descends assuming that no obstruction has interfered with the beam between the photoelectric cells and the photoelectric contacts PE-1 and PE-2 are closed. While the elevator is descending switch LS-7 is closed thus energizing the stripper motor 116 and switch solenoid SM-3, thus causing the stripper arm to be transferred downwardly until LS-9 is contacted again opening the stripping motor circuit. When the elevator descent is arrested by interruption of the photoelectric cell beams and by the consequent opening of contacts PE-1 and PE-2, switch LS-5 will close energizing the platform motor 104, switch solenoid SM-2-R, thus causing the platform to move in the reverse direction toward its raised inoperative position, and at the same time stripping the tier of units or packages onto the pallet. The platform continues to move to its raised inoperative position until switch LS-6 is engaged and moved to an open position. Switch LS-6-A closes energizing the elevator motor 74 raise switch solenoid SMIR causing the elevator to ascend. The elevator continues its ascending movement and before reaching its upper limit will permit switch LS-9 to open, switch LS-7-A to close, and switch LS-5 to open. The elevator will stop at the loading level when it actuates switch LS-10, thus deenergizing the elevator raise switch solenoid SMIR. Upward movement of the elevator also actuates switch LS-1, which since LS-2 is closed energizes the platform motor 104 forward switch solenoid SM-2-F causing the motor to move the platform rolls downwardly and rearwardly to the proper loading position. Switch LS-2 is then opened disengaging the switch relay SM-2-F and arresting the forward movement of the platform motor 104 and platform. Switch LS-2-A then closes energizing the stripper motor switch relay SM-3 causing the stripper arm to return to its normal position.

The invention having been described what is claimed is:

1. In a pallet loading mechanism, a frame having a high package loading station and a low level pallet loading station, a package supporting elevator vertically shiftable within the frame and having a loading and discharge position vertically overlying said pallet supporting station for movement between said high package loading station and a plurality of lower package discharge positions overlying said pallet loading station, an elevator platform comprising a series of rollers and a pair of flexible tracks on which said rollers are mounted, supporting guides on the elevator on which the tracks and rollers are movable transversely from a package supporting position overlying the pallet supporting station and then vertically at an edge of said elevator for discharging packages therefrom, and driving means for raising and lowering the elevator between said high level package loading station and successively determined lower package discharge positions over said pallet loading station, and means operable automatically for moving said elevator platform to the loading position on the elevator at said high package loading station, and operable automatically for withdrawing the elevator platform in each successive discharge position of the elevator to deposit packages from the platform onto the pallet.

2. In a pallet loading mechanism, a frame having a high package loading station and a low level pallet loading station, a package supporting elevator vertically shiftable within the frame and overlying said pallet supporting station for movement between said high package loading station and a plurality of lower package discharge positions overlying said pallet loading station, an elevator platform comprising a series of rollers and a pair of flexible tracks on which said rollers are mounted, supporting guides on the elevator on which the tracks and rollers are movable transversely from a package supporting position overlying the pallet supporting station, and then vertically at an edge of said elevator for discharging packages therefrom, a package stripper mounted on said elevator for movement between inoperative and package engaged positions for stripping packages from the platform during withdrawal thereof, driving means for raising and lowering the elevator, control means operative to arrest the downward movement of the elevator in successive package discharge positions, and means operative in each of said positions for shifting the stripper and for withdrawing the platform to discharge packages from the platform onto the pallet.

3. Apparatus for loading package units into multi-tiered stacks of multi-unit layers, comprising a low level load tiering station, and a high level unit layer loading station, an elevator, mounted for vertical movement relative to said load tiering station, a load supporting platform mounted on said elevator and adapted to receive and support a group of package units in side-by-side relation thereon vertically over the load tiering station, said platform being mounted to be withdrawn and thereby to discharge a multi-unit layer over said load tiering station, a stripping device operable during said discharge movement of the platform to support said group of package units vertically over the load tiering station, driving means for raising and lowering the elevator between said high level package loading station and successive multi-unit layer discharge positions at lower levels than said loading station over said load tiering station, and means for actuating said platform and stripping device therewith to discharge a multi-unit layer from said platform over the load tiering station at each successive lower multi-unit layer discharge position of said elevator.

4. In a pallet loading machine, a pallet loading station comprising a frame adapted to receive at a low level therein a package supporting pallet, a package supporting elevator vertically shiftable within the frame and overlying said pallet, an elevator platform supported for movement with the elevator and shiftable thereon laterally from a package loading and discharge support position overlying the pallet to discharge packages therefrom, a package stripper mounted on said elevator for movement between inoperative and package engaging positions for discharging packages from the laterally displaced platform, a package loading conveyor positioned for loading packages onto said elevator at a high level, driving means including an electric motor on the frame and connections therefrom for lowering and raising the elevator, an electric motor mounted on the elevator and connections therefrom for moving the stripper to engaging position, an electric motor on the elevator and connections for shifting the platform to discharge packages therefrom, a sensing device responsive to an obstruction indicating the approach of the elevator to a limit of downward movement in each of successive discharge positions, and means controlled by said sensing device for initiating the package discharge movements of the stripper and the platform.

5. In a pallet loading machine, a pallet loading station comprising a frame adapted to receive at a low level therein a package supporting pallet, a loading conveyor connecting with the frame at a loading level substantially above the pallet, a package supporting elevator vertically shiftable within the frame and overlying said pallet, a platform in said elevator comprising a series of package supporting rollers and flexible carriers supporting said rollers having a loading and discharge position vertically overlying the pallet and arranged to be withdrawn transversely and then vertically at an edge of said elevator for discharging packages therefrom, power means on the elevator for shifting said flexible carriers and package supporting rollers between package supporting and withdrawn package discharge positions, a package stripper mounted on said elevator for movement between inoperative and package engaging positions for stripping packages from the platform during withdrawal thereof, driving means for raising and lowering the elevator between the loading level and successive discharge levels, control means operative to arrest the downward movement of the elevator in each successive discharge position, and means operative in each of said positions for shifting the stripper and for withdrawing the platform to deposit packages from the platform onto the pallet.

6. Apparatus for loading package units into multi-tiered stacks of multi-unit layers comprising a frame having a low level load tiering station, and a high level unit layer loading station, an elevator mounted for vertical movement between said high level unit layer loading station overlying said low level tiering station and a plurality of multi-unit layer discharge positions at lower levels than said loading station overlying said pallet loading station, a platform movably supported on the elevator for movement laterally from the unit layer loading and discharge support position overlying the load tiering station, a stripping device operable to strip a unit layer from the platform upon movement thereof from the unit layer support position, a driving motor and driving means connected with the motor for raising and lowering the elevator between said high multi-unit layer loading position and successively determined lower multi-unit layer discharge positions, a separate electric motor mounted on the elevator, and driving connections between said separate motor and platform for shifting the platform to and from the multi-unit support position, a third electric motor mounted on the elevator, and driving connections between said third motor and stripping device for shifting the stripping device between said multi-unit layer engaging and inoperative positions, and means for controlling each of said driving means and motors for operating the elevator, platform and stripper in an automatic cycle.

7. Apparatus for loading units into multi-tiered stacks of multi-unit layers, comprising a low level load tiering station and a high level multi-unit layer loading station, an elevator mounted for vertical movement relative to said load tiering station, a load supporting platform mounted on said elevator and adapted to receive and support a group of units in side-by-side relation thereon vertically over the load tiering station, said platform being mounted to be withdrawn and thereby to discharge a multi-unit layer over said load tiering station, a stripping device operable during said discharge movement of the platform to support said group of units vertically over the load tiering station comprising a stripper rod and an actuating mechanism for said rod carried by the elevator for moving said stripper rod between a raised inoperative position and a package unit engaging position, and including a yieldable connection between the rod and actuating mechanism for yieldably supporting the rod in the package unit engaging position, means for actuating said platform and stripper rod actuating mechanism therewith to discharge a multi-unit layer from said platform over the rod tiering station, and means for raising and lowering said elevator and platform between said high level multi-unit layer loading station and successive lower level multi-unit layer discharge positions over said load tiering station.

8. In a pallet loading mechanism, a frame having a high package loading station and a low level pallet load tiering station, a package supporting elevator vertically shiftable within the frame and overlying said pallet supporting station for movement between said high package loading station and a plurality of lower package discharge positions overlying said pallet loading station, a platform carried from the elevator adapted to receive and support a group of packages in side-by-side relation thereon vertically over the pallet loading station, driving means for raising and lowering the elevator and platform therewith between said high level package loading position and successively determined lower package discharge positions over said pallet loading station, power means for moving the platform between package support and withdrawn package discharge positions, and a stripper device operable during said discharge movement of the platform to support said group of packages vertically over the load tiering station comprising a stripper rod, and actuating mechanism for said rod including an electric motor carried by the elevator for moving said stripper rod between a raised inoperative position and a package unit engaging position.

9. In a pallet loading mechanism, a frame having a high package loading station and a low level pallet load tiering station, a package supporting elevator vertically shiftable within the frame and overlying said pallet supporting station for movement between said high package loading station and a plurality of lower package discharge positions overlying said pallet loading station, a platform carried from the elevator adapted to receive and support a group of packages in side-by-side relation thereon vertically over the pallet loading station, driving means for raising and lowering the elevator and platform therewith between said high level package loading position and successively determined lower package discharge positions over said pallet loading station, power means for moving the platform between package support and withdrawn package discharge positions, a stripper device comprising a stripper rod, an actuating mechanism for said rod including an electric motor carried by the elevator, a crank arm connected to be driven through successive 180° increments of revolution by said motor and connections from the crank arm including a yieldable connection for moving said stripper rod from a raised inoperative position yieldably against a tiered group of said packages on the platform, and control means for actuating said driving means, said power means and said stripper motor in accordance with an automatic cycle to lower the elevator and platform, to discharge the packages on the platform in tiered relation over the pallet loading station, and return said elevator, and stripper device platform to the initial loading position.

References Cited in the file of this patent

UNITED STATES PATENTS

| | | |
|---|---|---|
| 674,262 | Duncan et al. | May 14, 1901 |
| 2,323,174 | Wikle | June 29, 1943 |
| 2,653,679 | Hamilton | Sept. 29, 1953 |
| 2,675,928 | Slater | Apr. 20, 1954 |

FOREIGN PATENTS

| | | |
|---|---|---|
| 882,529 | Germany | July 9, 1953 |
| 906,319 | Germany | Mar. 11, 1954 |